United States Patent [19]

Williams et al.

[11] Patent Number: 5,007,481
[45] Date of Patent: Apr. 16, 1991

[54] METHOD OF TREATING SUBTERRANEAN FORMATIONS USING A NON-DAMAGING FRACTURING FLUID

[75] Inventors: Dennis A. Williams, Houston; Roger L. Horton, Kingwood; John C. Newlove, Kingwood; Robert E. Chumley, Kingwood, all of Tex.

[73] Assignee: Exxon Chemical Patents, Inc., Linden, N.J.

[21] Appl. No.: 473,863

[22] Filed: Feb. 2, 1990

[51] Int. Cl.$^5$ .......................................... E21B 43/267
[52] U.S. Cl. ..................................... 166/300; 166/308; 252/8.551
[58] Field of Search ........................ 166/271, 300, 308; 252/8.551

[56] References Cited

U.S. PATENT DOCUMENTS

| | | | |
|---|---|---|---|
| 3,816,151 | 6/1974 | Podlas | 252/8.551 X |
| 3,938,594 | 2/1976 | Rhudy et al. | 166/308 |
| 4,137,182 | 1/1979 | Golinkin | 252/8.551 |
| 4,210,206 | 7/1980 | Ely et al. | 252/8.551 |
| 4,541,935 | 9/1985 | Constien et al. | 166/308 X |
| 4,741,401 | 5/1988 | Walles et al. | 166/300 |

Primary Examiner—George A. Suchfield
Attorney, Agent, or Firm—R. L. Graham

[57] ABSTRACT

Subterranean formations are fractured by use of an aqueous fracturing fluid containing an effective amount of a copolymer of acrylamide and potassium acrylate crosslinked with a titanium or zirconium compounds. The fracturing fluid also contains an oxidative gel breaker. The method is particularly suited for treatment of deep, high temperature formations.

12 Claims, 2 Drawing Sheets

METHOD OF TREATING SUBTERRANEAN FORMATIONS USING A NON-DAMAGING FRACTURING FLUID

BACKGROUND OF THE INVENTION

1. Field of the Invention

This invention relates to the hydraulic fracturing of subterranean formations. In one aspect, the invention relates to the use of a non-damaging polymeric thickener for aqueous fracturing fluids capable of use in deep, high temperature wells.

2. Description of the Prior Art

Hydraulic fracturing has been widely used as a means for improving the rates at which fluids can be injected into or withdrawn from subterranean formations surrounding oil wells, gas wells, water injection wells, and similar boreholes. The fracturing methods employed normally involve the injection of a viscous fracturing fluid having a low fluid loss value into the well at a rate and pressure sufficient to generate a fracture in the exposed formation, the introduction of fluid containing suspended propping agent particles into the resultant fracture, and the subsequent shutting in of the well until the formation is closed on the injected particles. This results in the formation of a vertical, high-conductivity channels through which fluids can thereafter be injected or produced. The conductivity obtained is a function of the fracture dimensions and the permeability of the bed of propping agent particles within the fracture.

In order to generate the fracture of sufficient length and width and to carry the propping agent particles into the fracture, it is necessary for the fluid to have relatively high viscosity, low friction loss, and non-damaging properties. The viscosity in aqueous liquids is provided by the addition of polymers, frequently called thickeners. Following the treatment of the well, it is desirable to return the aqueous liquids to its low viscosity state to enhance cleanup, thereby permitting the fracturing fluid and polymer to be removed from the formation and the propped fracture. The highly viscous liquid if left in the fracture would reduce formation permeability and impede the production of formation fluids through the propped fracture. Moreover, the residue of the polymer on the fracture face and in the pores of the propped fracture would significantly reduce fluid permeability therethrough.

The polymers used as aqueous thickeners must impart sufficient fluid viscosity at the temperature of the formation to generate the desired fracture and suspend the proppant. The polymers are frequently crosslinked to achieve the necessary viscosity. One problem associated with some crosslinked polymers (i.e. polymer crosslinked with borate compounds) is their thermal stability (see SPE Paper 18 862). Many crosslinked polymers degrade at temperatures of 180° F. Other crosslinkers, such as certain chromuim compounds are falling into disuse because of their known toxicity.

In order to avoid the undesirable after effects of the polymer and polymer residue, it is now common practice to employ in the fracturing fluid chemicals ("breaker") which degrade the polymers. U.S. Pat. No. 4,741,401 discloses a number of oxidizing agents contained in capsules for breaking the fracture fluid. U.S. Pat. No. 3,938,594 discloses the use of sodium hypochlorite solution, acid, micellar solutions, and surfactants for degrading the fracturing fluid polymers. As described in detail in SPE Paper 18862, published March 13-14, 1989, some breakers in fracturing fluids for shallow, low temperature (100° F.) treatments are satisfactory for certain polymer gels.

These conventional breakers, however, are not particularly effective with organometallic crosslinked polymers. Moreover, in deep high temperature wells, particularly wells at temperatures in excess of 250° F., many breakers tend to degrade the polymer prior to completion of fracture generation phase of the operation.

Finally, the aqueous fracturing fluid must not cause damage to the formation by swelling formation clays. Formations typically contain clays, particularly montmorillinite, that have the property of swelling when wet. Clay swelling can reduce formation fluid permeability.

In summary, the fracturing fluid must be formulated to: (a) achieve sufficient viscosity, preferably delayed viscosity to minimize friction loss; (b) possess high temperature stability; and (c) have non-damaging properties. As described in detail below, the present invention employs a crosslinked copolymer which exhibits these properties.

Prior art references which disclose copolymers used in well operations are: U.S. Pat. No. 4,137,182 discloses acrylamide/methacrylate copolymer crosslinked with chromium ions (crosslinker) in presence of carbonate ion activator, oxylate ion (stabilizer), and persulfate ion (breaker);. U.S. Pat. No. 3,938,594 discloses acrylamide/Na+ acrylate copolymers crosslinked with chromium ions; U.S. Pat. No. 4,210,206 discloses acrylamide/ammonium acrylate copolymers crosslinked with dialdehydes; and U.S. Pat. No. 4,541,935 discloses titanium and chromuim crosslinkers for a variety of polymeric thickeners.

SUMMARY OF THE INVENTION

In accordance with the method of the present invention, a subterranean formation is fractured with an aqueous fracturing fluid which contains a high molecular weight copolymer of acrylamide and potassium acrylate crosslinked with a titanium or zirconium compound.

The copolymer comprises from 60 to 78 mole % acrylamide and from 22 to 40 mole % potassium acrylate.

The fracturing fluid will also include an effective amount of a gel breaker for degrading the polymer following the treatment.

Laboratory tests having shown that the crosslinked fracturing fluid of the present invention is capable of high temperature performance (i.e. 200° F. to 400° F.), and exhibits minimal formation damage.

DESCRIPTION OF THE PREFERRED EMBODIMENTS

Figure 1:
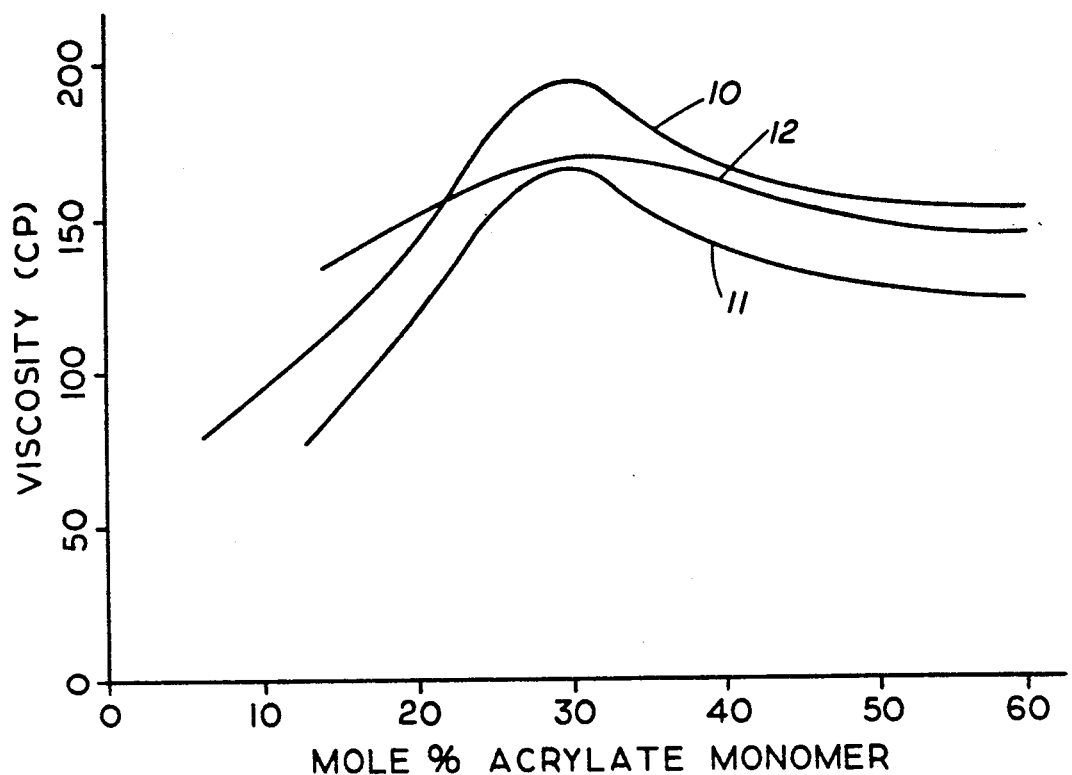
FIG. 1 is a plot of viscosity versus mole percent acrylate monomer comparing aqueous solutions of copolymers of acrylamide/potassium acrylate, acrylamide/sodium acrylate, and acrylamide/ammonium acrylate.

As indicated above, the method of the present invention employs an acrylamide/potassium acrylate copolymer, a crosslinker selected from zirconium and titanium compounds, and an oxidative breaker. Each of the compounds are described below in addition to other additives.

Copolymer

The acrylamide/potassium acrylate copolymer is a high molecular weight water-soluble polymer having a molecular weight (number avg.) of at least about 500,000. The copolymer comprises from about 22 to about 40 mole %, preferably 25 to 40 mole %, and most preferably 25 to 35 mole % potassium acrylate monomer, and from 60 to 78 mole %, preferably 60 to 75 mole %, most preferably 65 to 75 mole % of an acrylamide monomer. The optimum copolymer is about 30 mole % potassium acrylate and 70 mole % acrylamide.

The copolymer may be manufactured as follows: a water phase containing 199.1 g of acrylamide, 84.5 g of acrylic acid, 3.0 g of ethylenediaminetetraacetic acid, 0.2 g of potassium bromate, 60.3 g of potassium hydroxide and 342 g of water is homogenized with an oil phase containing 240 g of oil, 20 g of sorbitan monooleate, 0.2 g of 2,2'-azobis-(isobutyronitrile). The emulsion is then transferred to a suitable reaction vessel with stirring and is sparged with nitrogen. Polymerization is initiated and sustained by continuously adding a solution of sodium metabisulfite throughout the exotherm. The cooling is provided to maintain the temperature of the system between 35° C.–45° C. The polymerization is completed in about 6–10 hours to give an emulsion product of acrylamide/potassium acrylate copolymer. To produce a self-inverting product, 24 g of a breaker system composed of a 1.75:1 blend of the reaction product of nonylphenol with 6 moles of ethylene oxide and the reaction product of dinonylphenol with 24 moles of ethylene oxide is added.

The copolymer has the following formula:

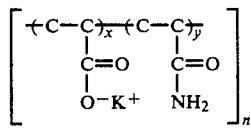

The copolymer preferably will have an average no. molecular weight of between 1,000,000 and 20,000,000 (and even higher) and most between 10,000,000 and 20,000,000. Molecular weights below 500,000 do not provide sufficient viscosity and molecular weights in excess of 20,000,000 are difficult to disperse and hydrate.

The concentration of the copolymer in the water will depend on several factors including copolymer molecular weight, degree of crosslinking contemplated, and the desired viscosity. Typically, however, from 0.05 to 1.0 wt %, preferably from 0.07 to 0.85 wt % of the copolymer is used which produces viscosities (before cross-linking) of about 30 to 200 centipoise (511 sec$^{-1}$) at ambient temperature. Unless otherwise indicated, concentration of components are based on the weight of the fracturing fluid.

Water

The water preferably contains less than about 5,000 ppm salt (e.g. NaCl, KCl) and preferably less than 2,500 ppm because the Cl$^-$ in the viscosity stability of the fracturing fluid. The system can tolerate higher salt contents when the water has been previously treated with an oxygen scavenger.

In the preferred operation fresh water available from municipal water will be used. In this application, it may be desirable to add clay swelling inhibitors (e.g. KCl) in accordance with practices well known in the industry.

Crosslinker

Titanium compounds are the preferred crosslinkers for use in the method of the present invention. These include titanates such as titanium acetylacetonate. (TiAA), titanium triethanolamine (TiTEA), and titanium lactic acid (TiLA).

Other useable crosslinkers include zirconium compounds such as zirconium triethanolamine and zirconium hydroxy-ethyl-tris-(hydroxypropyl) ethylene diamine.

The titanium and zirconium crosslinker are commercially available. For example, titinates and zirconates are marketed by DuPont as "Tyzor" crosslinkers.

In practice, it is preferred to first dissolve the crosslinker in a water soluble or dispersible solvent such as an alcohol (IPA) in order to better meter it into the hydraulic fracturing fluid. The preferred volume ratios of crosslinker to alcohol is 1:10 to 1:1, preferably 2:5 to 1:5.

Gel Breaker

The oxidative breakers useable in the present invention are commercially available as persulfates such as ammonium persulfates. Other useable breakers include perborates such as the ammonium perborate and potassium perborate. Other oxidative breakers well known to those skilled in the art may also be used.

An effective amount of breaker is used to degrade the polymer and/or crosslinker after about 2 hours, generally between 2 to 6 hours, at the formation temperature. Normally from 10 to 1200 ppm of the breaker is added to the fracturing fluid.

Other Additives

The fracturing fluid may also include corrosion, inhibitors, stabilizers, surfactants, fluid loss additives, etc. The fluid will generally include a proppant during a portion of the fracturing treatment. The fracturing fluid of the present invention permits the use of any of the presently used proppants such as high strength ceramics, sintered bauxite, etc., and conventional sand. Proppants are generally in the size range of 10/16, 20/40 mesh (U.S. Sieve).

Operation

The field preparation and pumping of the fracturing fluid according to the present invention can be performed by either of two processes: continuous mixing or batch mixing. The preferred process for carrying out the invention is by the continuous mixing as described below.

In the continuous process, water such as city water is drawn from a storage vessel at a known rate and the copolymer (e.g. a liquid concentrate) is metered at a rate calculated to give the desired concentration of copolymer in the water. The copolymer will generally evenly disperse in the water and hydrate quickly (generally less than 3 minutes) to provide greater than 90% of its final viscosity yield. In the continuous process it is necessary to have fast hydration in order to quickly develop fluid viscosity for suspending the propping materials down the well and into the fracture and generate a fracture of sufficient width. Also, the polymer should be adequately hydrated before the cross-linking reaction occurs in order to maximize the viscosity of the crosslinked gel.

The other additives such as crosslinkers, surfactants, fluid loss additives, proppants, breakers, biocides, etc. are then added to the fluid. The resultant mixture is then pumped at a rate sufficient to initiate and propagate the fracture in the subterranean formation.

An important feature of the fracturing fluid used in the method of the present invention is that its viscosity is relatively low when it initially enters the formation. Too high a viscosity (i.e. greater than 1000 cp) can cause the fracturing forces to exceed the confining strength of the boundary formations and cause the fracture to enter a non-production zone. Relatively low viscosity fluids (between 20 and 1000 cp) produce less stress on the boundary formations and avoid the risks described above.

The preferred fracturing fluid has viscosity of less than 600 cp, but greater than 40 cp at the temperature and shear rate encountered in the formation being treated.

In the batch process, the desired amount of copolymer, which is available commercially as a powder or granular product or liquid emulsion, is dispersed in a tank (typically 20,000 gallon) filled with fresh water or city water and circulated for at least thirty minutes to dissolve or disperse the copolymer in the water.

With the copolymer dissolved or dispersed in the water, pumping operations are commenced. The crosslinker and breaker are added to the water "on the run", so that crosslinking occurs between the surface and the formation. As is demonstrated by the experiments described below, crosslinking begins at a temperature between about 120° F. and 150 F. The crosslinked viscosity is developed at a subsurface location and is sufficient to generate the fracture of desired length and geometry.

Following breakdown of the formation in both the continuous and batch process, proppant is added to the fluid and carried to and deposited in the fracture. The well is then shut in permitting the fracture to close on the proppants and the breaker to degrade the crosslinked copolymer.

In some operations, an acid or oxidizing agent may be injected into the formation following the fracture treatment to enhance polymer degradation.

EXPERIMENTS

Experiments were carried out to demonstrate the following properties of the copolymer used in the method of the present invention: (a) the improved performance of the acrylamide/potassium acrylate copolymer; (b) thermal stability; (c) controlled crosslinking action, (d) nondamaging properties, and (e) rapid hydration of the copolymer.

Materials

Materials used in the experiments were as follows:
Water: city water
Copolymer: copolymers of acrylamide and acrylate salts
Crosslinker: 25 vol % of a titanium acetylacetonate (marketed as Tyzor GBA by DuPont) dissolved in 75 vol.% of an IPA.

Unless otherwise indicated, the water and crosslinker used in the experiments were as identified above.

Test Procedure

The copolymer was hydrated in the water for 5 seconds. The crosslinker then was added and stirred for one minute. Forty milliliters (40 ml) of the resultant mixture was then placed in a Fann 50 viscosimeter and heated to 250° F. The viscosity then was measured at a shear rate of 170 sec$^{-1}$ after 2 hours.

Unless otherwise indicated herein, the viscosity measurements described in this application were with a Fann 50 viscosimeter and at a shear rate of 170 sec$^{-1}$ after 2 hours at the indicated temperature.

Experimental Results

Group 1 experiments were carried out to determine the effects of various copolymers of acrylate salts on the fracturing fluid viscosity. FIG. 1 is a plot comparing three acrylamide/acrylate salt copolymers described as follows:

curve 10 is a plot of crosslinked aqueous solutions of 0.57 wt % acrylamide/potassium acrylate copolymers. The acrylamide/potassium acrylate mole ratios were 95/5, 80/20, 70/30, 60/40, and 40/60, and the copolymer molecular weight was 10-20 million;

curve 11 is a plot of crosslinked aqueous solutions of 0.57 wt % acrylamide/sodium acrylate copolymers. The acrylamide/sodium acrylate mole ratios were 80/20, 70/30, 60/40, and 40/60. The copolymer molecular weight was between 10-20 million.

curve 12 is a plot of crosslinked aqueous solutions of 0.57 wt % acrylamide/ammonium acrylate copolymers. The mole ratios were the same as curve 11. The copolymer molecular weight was between 10 to 20 million.

The FIG. 1 data clearly demonstrate the superiority (vis-a-vis the other acrylate salt monomers) of the acrylamide/potassium copolymer in developing viscosity at acrylate monomer concentrations between about 22 and about 40 mole %, (the balance being acrylamide monomer). Potassium acrylate monomer concentration between 25 and 35 mole % exhibit particularly improved viscosity.

Group 2 experiments demonstrates the effect of varying the concentrations of the copolymer (potassium acrylate) and the crosslinker. Each of the samples A-J were prepared with 70/30 mole ratios of acrylamide/potassium acrylate copolymers and from 0 to 1000 ppm as TiAA of the crosslinker. Samples K-N were prepared using crosslinked sodium and ammonium acrylate copolymers. All samples were heated to 250° F. and were tested after 2 hours. Table I presents the viscosity data.

TABLE I

| Co-polymer Sample | Acrylate Salt Anion | mole % | Copolymer concentration wt % | Crosslinker ppm (as TiAA) | Viscosity |
|---|---|---|---|---|---|
| A | K+ | 30 | 0.29 | 0 | 11 |
| B | K+ | 30 | 0.29 | 378 | 30 |
| C | K+ | 30 | 0.29 | 567 | 76 |

TABLE I-continued

| Co-polymer Sample | Acrylate Salt Anion | Acrylate Salt mole % | Copolymer concentration wt % | Crosslinker ppm (as TiAA) | Viscosity |
|---|---|---|---|---|---|
| D | K+ | 30 | 0.29 | 756 | 31 |
| E | K+ | 30 | 0.29 | 945 | 19 |
| F | K+ | 30 | 0.57 | 0 | 118 |
| G | K+ | 30 | 0.57 | 378 | 163 |
| H | K+ | 30 | 0.57 | 567 | 191 |
| I | K+ | 30 | 0.57 | 756 | 186 |
| J | K+ | 30 | 0.57 | 945 | 171 |
| K | Na+ | 30 | 0.29 | 567 | 58 |
| L | Na+ | 30 | 0.57 | 756 | 130 |
| M | NH4+ | 40 | 0.29 | 567 | 66 |
| N | NH4+ | 40 | 0.57 | 378 | 174 |

As can be seen from the data in Table I the concentrations of the copolymer and the crosslinker each has a significant effect on the viscosity of the water. The preferred copolymer concentration is between 0.20 to 0.60 wt % and the preferred crosslinker concentrations is between 300 to 980 ppm.

The Table I data also demonstrate superiority of the acrylamide/K+ acrylate copolymer over the Na+ and (NH4)+ acrylate copolymers at comparable copolymer and crosslinker concentrations.

Figure 2:
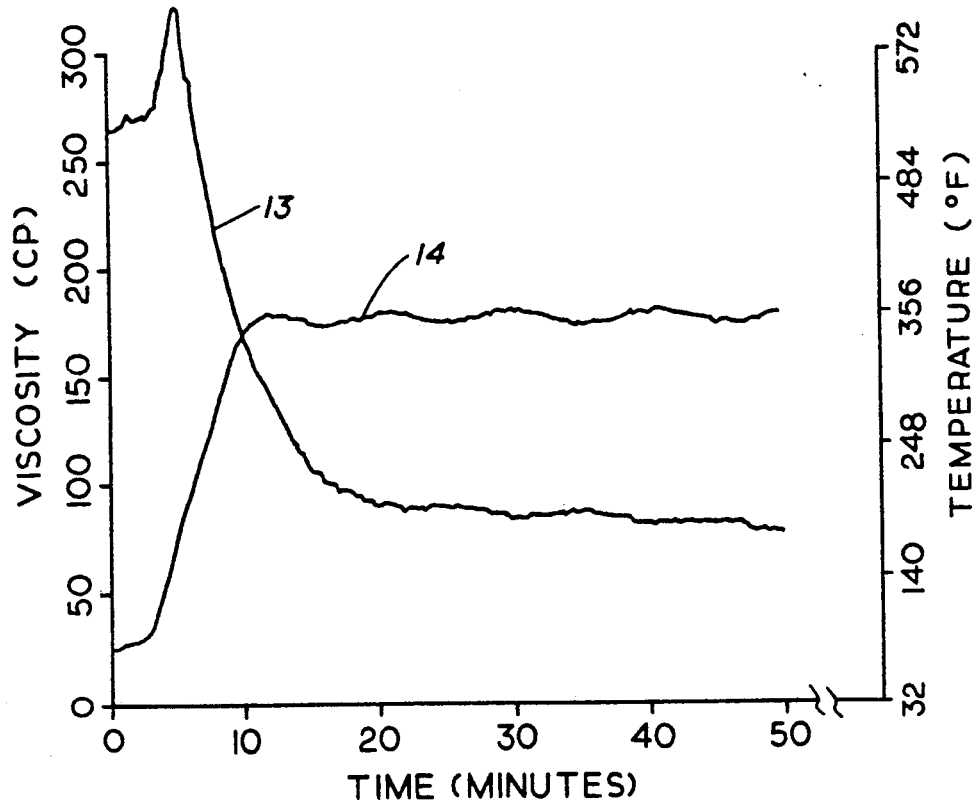
FIG. 2 is a plot of viscosity and temperature versus time of an aqueous solution of acrylamide/potassium acrylate.

Group 3 tests were carried out to demonstrate the retarded gelling effect of the crosslinker and the thermal stability of the acrylamide/potassium acrylate copolymers. The tests were performed in a Fann 50 viscosimeter which recorded temperature, time, and viscosity. The samples used had the same composition as Sample H shown in Table I. Curve 13 of FIG. 2 is a plot showing the fluid viscosity versus time and curve 14 is a plot showing the temperature of the fluid at the same time. The copolymer and the crosslinker were introduced into the viscosimeter at time 0 (Temp. of about 80° F.) and the pressure maintained at 200 psi.

With reference to curves 13 and 14 of FIG. 2, as the temperature increased to about 95° F., the viscosity remained about the same (260–270 cp). However, as the temperature approached about 140° F., the viscosity increased dramatically, indicating the effects of controllable polymer crosslinking. The viscosity peaked at about 300 cp and began dropping to 165 cp at 30 minutes when the temperature reached the control temperature of 350° F. The viscosity dropped for another 30 minutes and leveled off at about 85–90 cp and maintained that viscosity for the remaining 96 minutes of the test. Similar tests indicated thermal stability up to 400° F. but at lower viscosity (43 cp after 2 hours). The acrylamide/K+ acrylate copolymers at the preferred K+ acrylate concentration are particularly suited for treatment of deep, high temperature formation (200° F.–400° F.) and extremely high temperature formations (250° F.–400° F.)

Group 4, tests were conducted to compare the performance of the titanium and zirconium as crosslinkers for acrylamide/potassium acrylate copolymers in fresh water. Sample H copolymer was blended with the crosslinker and sheared in a Fann 50 viscometer for 2 hours at a temperature of 250° F., and the viscosity measured. The tests were carried out under the same conditions except that the crosslinker was changed. These data are presented in Table II.

TABLE II

| Copolymer Sample | Crosslinker Compound | PPM | Viscosity |
|---|---|---|---|
| H | Zr[1] | 2292 | 152 |
| H | Ti[2] | 567 | 191 |
| H | Zr[1] | 1529 | 145 |
| H | Ti[2] | 378 | 163 |

[1]Prepared as described in U.S. Pat. No. 4,534,879.
[2]Titanium acetylacetonate marketed by DuPont as Tyzor ® GBA.

As can be seen, the titanium crosslinker was more effective than the zirconium crosslinker and is therefore the preferred crosslinker at 200°–275° F.

Group 5 tests were conducted to demonstrate the non-damaging effects of the copolymer. The tests involved immersing a sodium montmorrilonite clay sample in fresh water (e.g. tap water) and also in fresh water containing various concentrations of KCl and acrylamide/potassium acrylate copolymer. The copolymer was the same as sample H. The samples did not contain crosslinkers but the presence or absence of crosslinkers would have no effect on clay swelling. Failure was determined by visually observing disintegration of the clay sample in water sample.

TABLE III

| Test Water | Time to Failure |
|---|---|
| Fresh Water | immediate |
| Fresh Water with 5% KCl | 45 seconds |
| Fresh Water with 2% KCl | 1 minute 25 seconds |
| Fresh Water with 1% KCl | 2 minutes 45 seconds |
| Fresh Water with 0.5 vol. % Copolymer | 3 hours |
| Fresh Water with 1 vol. % Copolymer | 6 hours |
| Fresh Water with 2 vol. % Copolymer | Intact after 7 hours |

Based upon the above data it can be seen that the clay sample immersed in an aqueous solution of copolymer remained in tact for a substantial longer period of time than clay in the water alone or in KCl solutions. These data indicate that the clay swelling and resultant formation damage is minor with the copolymers employed in the present invention. The nondamaging effects of the acrylamide/potassium acrylate copolymer is believed to be due to two mechanisms: (a) exchange of K+ ions into the clay crystal lattice to form a nonswelling form of the clay, and (b) reduction of water mobility into the clay due to the film forming property of the polymer on the clay.

Figure 3:
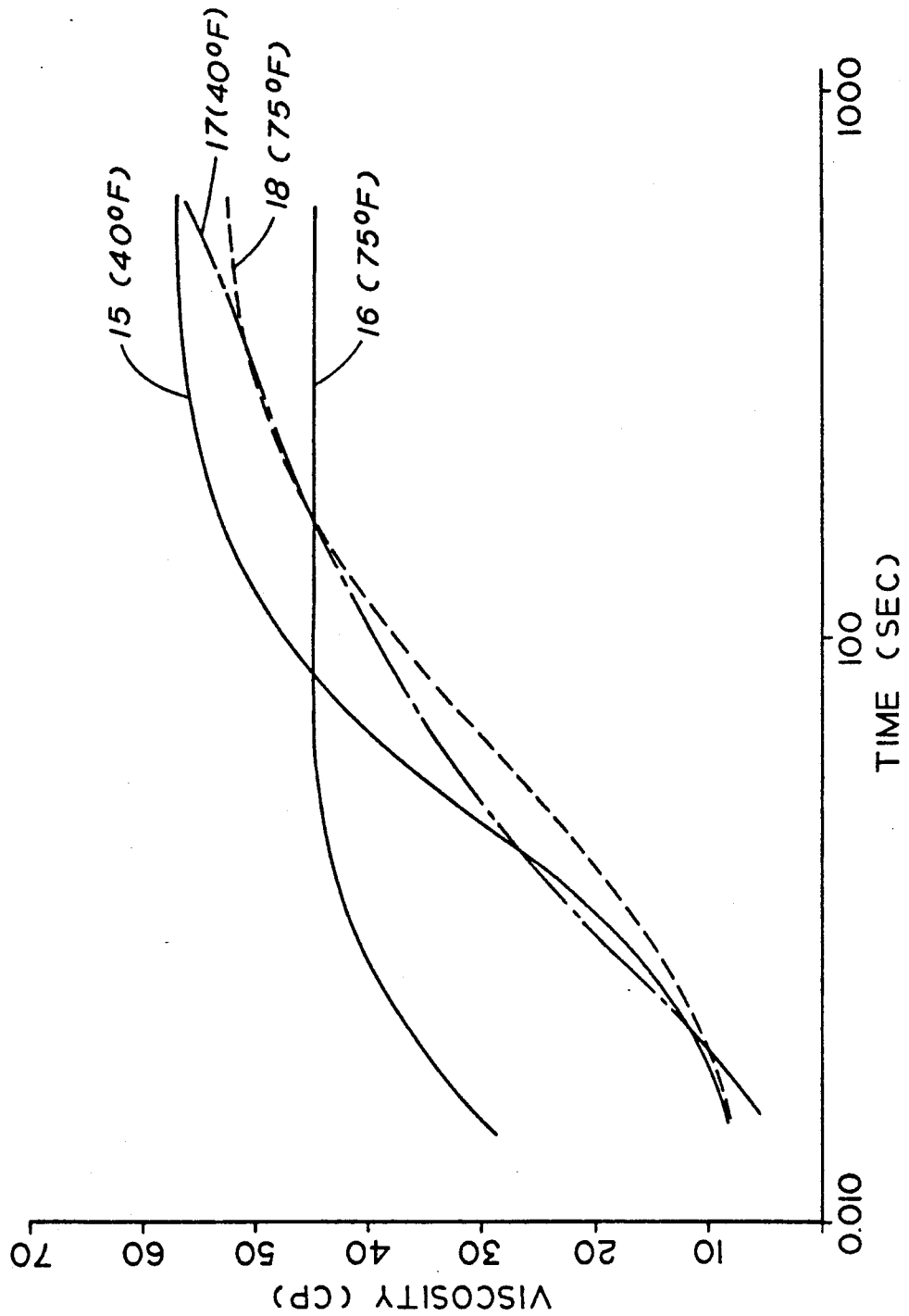
FIG. 3 compares hydration rate as a function of viscosity of a potassium/acrylate copolymer with hydration rate of potassium/methacrylate copolymer.

Group 6 tests were carried out to compare hydration rates of acrylamide/potassium acrylate copolymers (Sample H) with acrylamide/potassium methacrylate copolymers (mole ratios of 70/30). The tests were carried out in a Fann 35 viscometer at 300 RPM and at temperatures of 40° F. and 75° F. FIG. 3 presents the plots of the four viscosity-temperature data, with curves 15 and 17 comparing the acrylamide/potassium acrylate copolymer with acrylamide/potassium methacrylate copolymer at 40° F.; and curves 16 and 18 make the same comparison at 75° F.

The curves of FIG. 3 reveal that the acrylamide/potassium acrylate copolymer hydrates much faster than the acrylamide/potassium methacrylate copolymers at both test temperatures, with the tests at 75° F. being more dramatic.

The significance of the hydration rate is in connection with the "continuous mixing" process for carrying out the invention. In this process, the copolymer is metered into the water "on the fly". The water with the copolymer is then blended with other additives. The copolymer should hydrate as quickly as possible in this process for two reasons: (a) to suspend the proppant and (b) to avoid the inhibiting effects of crosslinking (i.e. if crosslinking occurs before about 90% hydration has occurred, the crosslinking can reduce the maximum yield of the crosslinked polymer).

Most of the hydration should occur at or near surface temperatures. The 75° F. test data are therefore particularly relevant in evaluating hydration rates.

In summary, the method of the present invention employs a fracturing fluid gelled with an acrylamide/potassium acrylate copolymer which exhibits rapid hydration of the copolymer, controlled crosslinking, stability at high temperatures (200° F. to 400° F.), and nondamaging properties.

While the present invention has been described specifically with reference to a fracturing treatment, it will be appreciated by those skilled in the art that the mechanisms involved have applications in other well treating operations such as well completions which require high viscosity, nondamaging fluids.

What is claimed is:

1. A process for fracturing a subterranean formation wherein an aqueous fracturing fluid is injected through a well and into the formation at a pressure and rate sufficient to form a fracture therein, the improvement wherein the aqueous fracturing fluid includes
   (a) an effective amount of a copolymer of acrylamide and potassium acrylate crosslinked with a titanium or zirconium compound, the acrylamide comprises from 60 to 78 mole % of the copolymer and the potassium acrylate comprises 22 to 40 mole % of the copolymer and the concentration of the crosslinked copolymer being sufficient to provide the aqueous fracturing fluid with a viscosity of between 20 cp and 1,000 cp at 170 sec$^-$ at a temperature of at least 200° F.; and
   (b) an effective amount of an oxidative gel breaker capable of degrading the copolymer after about 2 hours.

2. The method of claim 1 wherein the titanium compound is titanium acetyl acetonate and is present in the fracturing fluid at a concentration of between 0.03 to 0.10 wt %, and the zirconium compound is zirconium triethanolamine and is present at a concentration of 400 to 2,000 ppm, said concentrations based on the weight of the fracturing fluid.

3. The method of claim 1 wherein acrylamide comprises from 65 to 75 mole % of the copolymer and the potassium acrylate comprises 25 to 35 mole % of the copolymer.

4. The method of claim 3 wherein the copolymer has a number average molecular weight of between 500,000 to 20,000,000.

5. The method of claim 1 wherein the copolymer is present in the aqueous fluid in a concentration of between 0.05 to 1.00 wt % and has the following formula

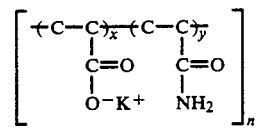

6. The method of claim 1 wherein the formation has a temperature of between 200° and 400° F., and said gelled fracturing fluid is stable at the formation temperature prior to breaking by said breaker.

7. A method of fracturing a subterranean formation penetrated by a borehole which comprises
   (a) injecting into the formation an aqueous fracturing fluid containing from 0.05 to 1.00 wt % of a copolymer of between about 22 and about 40 mole % of acrylamide, and 22 to 40 mole % of potassium acrylate crosslinked with an effective amount of a crosslinker selected from the group consisting of titanium compounds and zirconium compounds, and an effective amount of a persulfate breaker to degrade the crosslinked copolymer following the injection step;
   (b) permitting the crosslinked polymer to degrade; and
   (c) removing at least a portion of the degraded polymer from the fracture.

8. The method of claim 7 wherein the fracturing fluid further contains propping agent to prop the fracture open following treatment.

9. The method of claim 8 wherein the crosslinker is a titanium compound.

10. The method of claim 9 wherein the crosslinked copolymer is stable up to temperatures of 400° F.

11. A method of fracturing a subterranean formation penetrated by a wellbore which comprises
   (a) continuously pumping an aqueous fluid down the wellbore and into the formation;
   (b) adding to the fluid from 0.05 wt % to 1.0 wt % of a copolymer comprising from 60 to 78 mole % of an acrylamide and from 22 to 40 mole % of a potassium acrylate;
   (c) thereafter adding to the aqueous fluid containing the copolymer
      (i) an effective amount of a crosslinker selected from the group consisting of zirconium compounds and titanium compounds to provide the fracturing fluid with a viscosity of between 20 cp and 1000 cp at the formation temperature and a shear rate of 170 sec$^{-1}$, and
      (ii) an effective amount of an oxidative breaker to degrade the crosslinked copolymer after about two hours;
   (d) pumping the viscosified aqueous fluid in the formation to form a fracture therein;
   (e) permitting the aqueous fluid to set wherein the breaker causes the crosslinked copolymer to degrade; and
   (f) flowing formation fluids into the wellbore to remove portions of the aqueous fluid.

12. The method of claim 11 wherein the formation has a temperature of between 200° F. and 400° F.

* * * * *